Patented June 8, 1937

2,083,280

UNITED STATES PATENT OFFICE 2,083,280

HIGH QUALITY PRODUCTS FROM CELLULOSE

Erik Bror Fredrik Sunesson, Skoghall, Sweden

No Drawing. Application June 29, 1934, Serial No. 733,127. In Sweden July 5, 1933

2 Claims. (Cl. 8—2)

By the known processes it has not been possible to produce from sodium- or sulphate cellulose a product of very white color preserving the most important properties for subsequent treatment, such as high viscosity and the like.

It is common knowledge that one of the most difficult problems of the cellulose industry is, to produce a cellulose which possesses, besides certain chemical and physical properties enabling to use the cellulose as a substitute for cotton, also the viscosities destined for the actual purposes. Generally it may be said that in substances with very high viscosity the other properties do not suffice and, if the latter are altered in the favorable sense by different treatments, an unfavorable alteration in the viscosity always takes place.

These difficulties become greater if at the same time a high alpha cellulose content is demanded. Up to the present it has not yet been possible to produce from sulphate cellulose a purely white cellulose with high alpha content and possessing at the same time high viscosity, as is possible by the process according to the application.

By systematic experiments the reason for the unsatisfactory result of the known processes could be ascertained. This process avoids the usual inconveniences and makes it possible, to produce even from brown sulphate cellulose a product, which is suitable for use in the artificial silk industry or for the production of cellulose derivatives, such as ester or the like. According to the new process a cellulose produced according to the alkaline decomposition methods is first submitted to a further decomposition with application of oxidation and chlorination agents, an oxidation agent being first employed in a quantity up to 60% of the quantity of bleaching agent necessary for the complete bleaching, and then, with or without preceding washing, a chlorination agent in a quantity which corresponds to the capability of the cellulose to absorb chlorine. The reaction products which are formed are removed by a suitable washing process. The cellulose obtained in this manner is then submitted to a bleaching process by means of a bleaching agent which is mainly oxidizing and to a treatment with alkali up to the mercerization strength, and finally to a treatment with acids. The treatment with alkali of higher concentration may also take place prior to the bleaching or prior to the chlorination. As end product a very white cellulose is obtained possessing a high percentage of alphacellulose which is especially suitable for the production of different cellulose derivatives and the like.

A form of carrying out the process will be given in the following example, it being, however, evident that the method can be modified, dependent on the initial material and on the desired properties of the end product.

Example 1000 kgs. of unbleached cellulose, produced according to an alkaline decomposition method, with a chlor number according to Roe=5, is treated with a quantity of chloride of lime which corresponds to 50 kgs. of bleaching chlorine. When the chlorine of lime has been consumed, which takes about 1 hour, the cellulose is washed and then chlorinated with 30 kgs. chlorine, preferably in the form of chlorine water, this quantity of chlorine being absorbed in the course of 2 hours provided the temperature be maintained at 15 to 20° C. After the washing of the cellulose with water the chlorine lignine is separated out by dissolving with weak soda lye. The cellulose is then treated with a soda lye which contains 90 grs. NaOH per liter, at ordinary temperature, whereupon the alkalized cellulose is thoroughly washed with water. The subsequent bleaching is carried out with bleaching powder until the desired properties are obtained. After the bleaching the cellulose is accurately washed with water and then treated with about 1% hydrochloric acid during 30 minutes. The cellulose is finally thoroughly washed again with water.

I claim:—

1. A process for the production of purely white, strongly absorbing, highly viscous cellulose from alkali-liberated cellulose pulp, consisting in first subjecting the cellulose to the action of a quantity of hypochlorite up to 60% of the quantity necessary for complete bleaching consumption, then washing the substance and subjecting the washed substance to the action of a quantity of chlorine in an amount just sufficient to effect complete saturation of the treated cellulose, removing the reaction products, then treating the substance with an alkaline solution up to the point of mercerization to effect an increase of the alpha content, then bleaching the substance with hypochlorite until the desired whiteness is obtained and in subjecting the substance to the action of diluted acid.

2. A process for the production of purely white, strongly absorbing, highly viscous cellulose from sulphate pulp, consisting in first subjecting the cellulose to the action of a quantity of hyochlorite up to 60% of the quantity necessary for complete bleaching consumption, then washing the substance and subjecting the washed substance to the action of a quantity of chlorine in an amount just sufficient to effect complete saturation of the treated cellulose, removing the reaction products, then treating the substance with an alkaline solution up to the point of mercerization to effect an increase of the alpha content, then bleaching the substance with hypochlorite until the desired whiteness is obtained, and in subjecting the substance to the action of diluted acid.

ERIK BROR FREDRIK SUNESSON.